US009681350B1

(12) United States Patent
Marupaduga et al.

(10) Patent No.: US 9,681,350 B1
(45) Date of Patent: Jun. 13, 2017

(54) DIFFERENTIAL ROUTING OF VOICE HANDOVER TRAFFIC AND NON-VOICE HANDOVER TRAFFIC IN RESPONSE TO CONGESTION ON AN INTER-BASE-STATION INTERFACE

(71) Applicant: Sprint Spectrum L.P., Overland Park, KS (US)

(72) Inventors: Sreekar Marupaduga, Overland Park, KS (US); Naresh Madineni, Overland Park, KS (US); Saravana Velusamy, Olathe, KS (US); Andrew M. Wurtenberger, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 91 days.

(21) Appl. No.: 14/854,505

(22) Filed: Sep. 15, 2015

(51) Int. Cl.
*H04W 4/00* (2009.01)
*H04W 36/24* (2009.01)
*H04L 12/801* (2013.01)
*H04W 36/14* (2009.01)
*H04W 36/08* (2009.01)
*H04W 88/08* (2009.01)
*H04W 88/02* (2009.01)

(52) U.S. Cl.
CPC .......... *H04W 36/24* (2013.01); *H04L 47/12* (2013.01); *H04W 36/08* (2013.01); *H04W 36/14* (2013.01); *H04W 88/02* (2013.01); *H04W 88/08* (2013.01)

(58) Field of Classification Search
None
See application file for complete search history.

(56) References Cited

U.S. PATENT DOCUMENTS 6,603,971 B1 8/2003 Mohebbi
6,944,462 B2 9/2005 Riihinen et al.
7,076,214 B2 7/2006 Jabbary
(Continued)

OTHER PUBLICATIONS

Palat, Sudeep and Godin, Philippe, Alcatei-Lucent Strategic White Paper, The L TE Network Architecture, A Comprehensive Tutorial, 2009 D.
(Continued)

*Primary Examiner* — Chi H Pham
*Assistant Examiner* — Soon-Dong D Hyun (57) ABSTRACT

Disclosed are methods and systems to facilitate differential routing of voice handover traffic and non-voice handover traffic. In particular, a wireless communication system may include a controller, a backhaul interface that passes through the controller, an inter-base-station interface that does not pass through the controller, as well as first and second base stations that are communicatively linked via (i) the backhaul interface and (ii) the inter-base-station interface. With this arrangement, the system may encounter a trigger to configure transmission of handover signaling between the first and second base stations, and may responsively configure itself to transmit (i) via the inter-base-station interface handover signaling that facilitates handover between the first and second base stations of ongoing voice communications and (ii) via the backhaul interface handover signaling that facilitates handover between the first and second base stations of communications other than ongoing voice communications.

20 Claims, 5 Drawing Sheets

(56) References Cited

U.S. PATENT DOCUMENTS

| | | |
|---|---|---|
| 8,254,331 B2 | 8/2012 | Vargantwar |
| 8,861,477 B1 | 10/2014 | Goyal |
| 9,253,703 B1* | 2/2016 | Oroskar ............... H04W 36/30 |
| 2008/0153495 A1 | 6/2008 | Ogami et al. |
| 2008/0247361 A1 | 10/2008 | Jung et al. |
| 2012/0039299 A1* | 2/2012 | Teyeb ................. H04B 7/2606 370/331 |
| 2012/0063417 A1 | 3/2012 | Redana et al. |
| 2012/0190368 A1* | 7/2012 | Zhang ............... H04W 36/0055 455/436 |
| 2013/0115955 A1* | 5/2013 | Deng ................ H04W 36/0061 455/437 |
| 2014/0067984 A1 | 3/2014 | Danilak |
| 2014/0119196 A1 | 5/2014 | Hui et al. |
| 2014/0228031 A1* | 8/2014 | Masini ............. H04W 36/0083 455/436 |
| 2015/0126130 A1* | 5/2015 | Hong .................... H04W 24/10 455/67.11 |

OTHER PUBLICATIONS

Sesia, Stefan Ia, Toufik, Issam, and Baker, Matihew, LTE-The UMTS Long Term Evolution, From Theory to Practice, John Wiley and Sons, Ltd., 2009 D.

Pending U.S. Appl. No. 13/796,643, filed Mar. 12, 2013.

\* cited by examiner

DIFFERENTIAL ROUTING OF VOICE HANDOVER TRAFFIC AND NON-VOICE HANDOVER TRAFFIC IN RESPONSE TO CONGESTION ON AN INTER-BASE-STATION INTERFACE

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In accordance with the air interface protocol, each coverage area may define a number of channels or specific resources for carrying signals and information between the base station and UEs. For instance, certain resources on the downlink may be reserved to carry a reference signal that UEs may detect as an indication of coverage and may measure to evaluate coverage quality, other resources on the downlink may be reserved to carry other control signaling to UEs, and still other resources on the downlink may be reserved to carry bearer traffic and other such communications to UEs. Likewise, certain resources on the uplink may be reserved to carry various control signaling from UEs to the base station, and other resources on the uplink may be reserved to carry bearer traffic and other such communications from UEs.

When a UE is served by a base station, the base station and/or associated network infrastructure may maintain a "neighbor list" that indicates other nearby base stations to which UEs being served by the base station could potentially hand over. Such a neighbor list could specify various information about each such handover neighbor, including for instance one or more coverage frequencies on which the neighbor operates, a network address of the neighbor, and a geographic location of the neighbor. In practice, such neighbor data could be updated from time to time as changes are made in the configuration of the network, such as when base stations are added, removed, moved, or reconfigured. For instance, the neighbor data could be updated manually by engineering input as changes are made to the network and/or through an automated process as UEs report various detected neighbors.

Further, when the UE is served by the base station, the UE may regularly monitor the reference signal from that base station and reference signals from other base stations in the vicinity, to help ensure that the UE continues to operate in a most appropriate coverage area. If the UE finds that one or more other base stations provide sufficiently strong coverage, perhaps sufficiently stronger than the UE's currently serving base station, then the UE may initiate handover. For instance, the UE may transmit to its serving base station a measurement report that specifies the one or more detected coverage areas and, for each such coverage area, the detected signal strength. The serving base station (source base station) and/or associated network infrastructure may then decide based on the UE's measurement report to process a handover of the UE to a particular base station (target base station) from which the UE detected sufficiently strong signal strength.

OVERVIEW

In practice, an example wireless communication system may include at least first and second base stations as well as supporting network infrastructure to enable these first and second base station to serve UEs. This supporting network infrastructure may include at least one backhaul entity (e.g., a controller) that has a backhaul interface for communication with each of the first and second base stations and may also include other network entities. In some cases, such supporting infrastructure can facilitate communications between the first and second base stations. For instance, the first base station may transmit a message for receipt by the second base station by transmitting the message to the backhaul entity, and the backhaul entity may then transmit the message to the second base station. In this manner, the supporting infrastructure may provide one or more backhaul interfaces that the first and second base stations may each use to communicate with each other via a backhaul entity.

Additionally, the wireless communication system may also include a communication path through which the first and second base stations can communicate more directly with each other. For instance, the wireless communication system may include an inter-base-station interface that provides each of the first and second base stations with an ability to communicate with each other rather than having a backhaul entity facilitate communications between the first and second base stations as discussed above. By way of example, the first base station may transmit a message via the inter-base-station interface for receipt by the second base station and/or the second base station may transmit a message via the inter-base-station interface for receipt by the first base station.

With this arrangement, when the wireless communication system seeks to hand over a UE from being served by the first base station to being served by the second base station (or vice versa), the first and second base station may engage in handover signaling with each other to help facilitate this handover of the UE and perhaps may do so via the inter-base-station interface. By way of example, this handover signaling may involve the first base station transmitting a handover request message via the inter-base-station interface to the second base station to prepare the second base station to receive handover of the UE, such as by reserving resources to facilitate serving the UE. In this example, this handover signaling may then further involve the second base station transmitting via the inter-base-station interface to the first base station a handover request acknowledge message that carries information for use by the UE to engage in communication with the second base station.

In other examples, the first and second base stations may engage in handover signaling during a UE's ongoing voice communication. In doing so, the first and second base stations may engage in handover signaling that involves transmission via the inter-base-station interface of buffered voice data to be communicated as part of the UE's ongoing voice communication, so as to facilitate handover of the UE while also allowing the UE to continue to engage in the ongoing voice communication. Of course, other examples of handover signaling are possible as well.

Given this arrangement, the first and second base stations may engage in handover signaling with each other to facilitate handover of a single UE or perhaps to facilitate handover of several such UEs at once, among other possibilities. In some situations, such as when the first and second base stations engage in handover signaling with each other to facilitate handover of several UEs at once, the inter-base-station interface may become threshold congested. In particular, this may involve the inter-base-station interface experiencing a level of congestion that is at or above a threshold level of congestion. For example, after transmitting a handover request message via the inter-base-station interface to the second base station, the first base station may determine how long it take (e.g., determine a duration of time) to responsively receive via the inter-base-station interface a handover request acknowledge message. If this duration is at or above threshold duration, then the first base station may determine that the inter-base-station interface is threshold congested. As such, when the inter-base-station interface become threshold congested, this may result in delays of various transmissions over the inter-base-station interface, among other possible issues.

When the inter-base-station interface become threshold congested, the threshold congestion may not be problematic if the UE being handed over via the inter-base-station interface engages in communications that are not sensitive to delays in transmission. For instance, these communications may include best-effort traffic such as e-mail and web browsing traffic, among others. Whereas, threshold congestion of the inter-base-station interface may be especially problematic if the UE being handed over via the inter-base-station interface engages in real-time or delay-sensitive communications, such as in an ongoing voice communication.

For example, if the UE being handed over via the inter-base-station interface engages in an ongoing voice communication, threshold congestion of the inter-base-station interface may result in delays in transmission of buffered voice data, thereby decreasing the quality of service experienced by the UE and perhaps leading to interruptions to the ongoing voice communication. And in another example, if the UE being handed over via the inter-base-station interface engages in an ongoing voice communication, threshold congestion of the inter-base-station interface may result in loss of buffered voice data packets, which may ultimately lead to failure of the ongoing voice communication (e.g., a dropped call). In this manner, threshold congestion of the inter-base-station interface may lead to poor call quality and/or dropped calls, among other undesirable outcomes.

Disclosed herein is an arrangement to help overcome problems resulting from threshold congestion of the inter-base-station interface. In accordance with the disclosure, a wireless communication system may encounter a trigger to configure transmission of handover signaling between the first and second base stations. For example, this trigger may involve determining that the inter-base-station interface is threshold congested. Once the wireless communication system encounters this trigger, the wireless communication system may responsively configure itself to transmit via the backhaul interface handover signaling that facilitates handover between the first and second base stations of communications other than ongoing voice communications. And while doing so, the wireless communication system may also responsively configure itself to transmit (e.g., to continue transmitting) via the inter-base-station interface handover signaling that facilitates handover between the first and second base stations of ongoing voice communications.

In this manner, the wireless communication system may essentially offload to the backhaul interface transmission of handover signaling that facilitates handover of communications other than voice communications. Since these communications may not be sensitive to delays in transmission, the wireless communication system can perhaps afford to offload handover signaling in this manner without necessarily affecting user experience. Moreover, when the wireless communication system offloads handover signaling in this manner, this may reduce congestion on the inter-base-station interface, perhaps causing the inter-base-station interface to no longer be threshold congested. And when congestion is reduced on the inter-base-station interface, this may reduce or otherwise eliminate delays in transmission via the inter-base-station interface of handover signaling that facilitates handover between the first and second base stations of ongoing voice communications. Thus, the disclosed arrangement may result in improved call quality and perhaps in avoidance of dropped calls, among other possibilities.

Accordingly, disclosed herein is a method operable in a wireless communication system including a controller and first and second base stations. The first and second base stations are communicatively linked via (i) a backhaul interface on which the controller resides and (ii) an inter-base-station interface on which the controller does not reside. In accordance with the method, the wireless communication system may make a determination that a congestion level of the inter-base-station interface is at or above a threshold congestion level. In response to making the determination, the wireless communication system may be configured to transmit (i) via the inter-base-station interface rather than via the backhaul interface handover signaling that facilitates handover between the first and second base stations of ongoing voice communications and (ii) via the backhaul interface rather than via the inter-base-station interface handover signaling that facilitates handover between the first and second base stations of communications other than ongoing voice communications. And the wireless communication system may then transmit handover signaling based on the configuring.

Additionally, disclosed herein is a method operable in a wireless communication system including a controller and first and second base stations. The first and second base stations are communicatively linked via (i) a backhaul interface that passes through the controller and (ii) an inter-base-station interface that does not pass through the controller. In accordance with this method, the wireless communication system may serve a UE over an air interface connection between the UE and the first base station. While serving the UE, the wireless communication system may (i) encounter a trigger to hand over the UE from being served by the first base station to being served by the second base station and (ii) determine that a congestion level of the inter-base-station interface is at or above a threshold congestion level.

In response to encountering the trigger and to determining that the congestion level of the inter-base-station interface is at or above the threshold congestion level, the wireless communication system may make a determination of whether the UE is engaging in voice communications. If the determination is that the UE is engaging in voice communications, then, responsive to making the determination, the wireless communication system may transmit via the inter-base-station interface rather than via the backhaul interface handover signaling to hand over the UE from being served by the first base station to being served by the second base station. And if the determination is that the UE is not engaging in voice communications, then, responsive to making the determination, the wireless communication system may transmit via the backhaul interface rather than via the inter-base-station interface handover signaling to hand over the UE from being served by the first base station to being served by the second base station.

Further, disclosed herein is a wireless communication system including a backhaul-network entity, a backhaul interface that passes through the backhaul-network entity, an inter-base-station interface that does not pass through the backhaul-network entity, first and second base stations that are communicatively linked via (i) the backhaul interface and (ii) the inter-base-station interface, and a controller (e.g., the backhaul-network entity may be the controller) configured to cause the wireless communication system to perform operations. These operations may involve encountering a trigger to configure transmission of handover signaling between the first and second base stations. Also, these operations may involve, in response to encountering the trigger, configuring the wireless communication system to transmit (i) via the inter-base-station interface rather than via the backhaul interface handover signaling that facilitates handover between the first and second base stations of ongoing voice communications and (ii) via the backhaul interface rather than via the inter-base-station interface handover signaling that facilitates handover between the first and second base stations of communications other than ongoing voice communications. And then the operations may involve causing the wireless communication system to transmit handover signaling based on the configuring.

Yet further, in another respect, disclosed is a non-transitory computer-readable medium having stored thereon instructions executable by a processor to cause a wireless communication system to carry out functions such as those noted above, to facilitate differential routing of voice handover traffic and non-voice handover traffic in response to congestion on an inter-base-station interface.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Referring to the drawings, as noted above, FIG. 1 is a simplified block diagram of an example network arrangement in which the features of the present disclosure can be implemented. In particular, the figure depicts a first base station 12 and a second base station 14. In practice, these two base stations may take any of a variety of forms, such as the form of a small cell or the form of a macro base station. For example, an LTE network may include LTE macro base stations known as eNodeBs. Each such eNodeB has an antenna structure and associated equipment for providing an LTE coverage area in which to serve UEs such as an example UE 22. For instance, the first base station 12 may be an eNodeB 12 that radiates to provide a coverage area defining a wireless air interface through which the eNodeB 12 may communicate with one or more served UEs, such as UE 22, via the downlink and the uplink. Similarly, the second base station 14 may be an eNodeB 14 that radiates to provide a coverage area defining a wireless air interface through which the eNodeB 14 may communicate with one or more served UEs, such as UE 22, via the downlink and the uplink.

Figure 1:
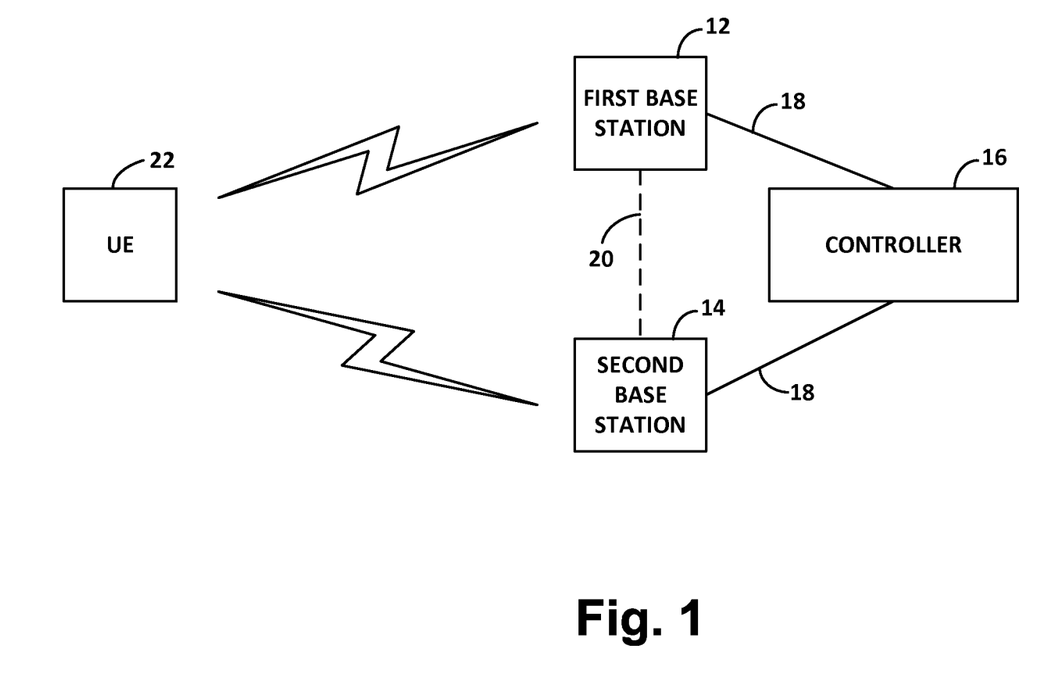
FIG. 1 is a simplified block diagram of an example network arrangement in which the features of the present disclosure can be implemented

As shown, the example network arrangement further includes a controller 16 that may help enable the first base station 12 (e.g., eNodeB 12) and the second base station 14 (e.g., eNodeB 14) to serve UEs. By way of example, in an LTE network, this controller 16 may be a mobility management entity (MME) that functions as a controller for the LTE network and that has an interface 18 (e.g., a backhaul interface 18) for communication with each of the eNodeBs 12-14. In practice, this interface 18 may be an S1-MME interface, which may carry S1AP signaling (e.g., per an S1 access protocol). As such, this arrangement can help manage registration of UEs with the network and paging of UEs served by each of the eNodeBs 12-14, among other possibilities. Of course, the controller 16 may also take other forms.

Furthermore, the controller 16 can facilitate communication between the eNodeBs 12-14. For instance, this arrangement allows the eNodeB 12 to transmit a message for receipt by eNodeB 14 by transmitting the message to the controller 16, and the controller 16 then transmitting the message to eNodeB 14. It should be understood, however, that the example network arrangement may also include a communication path through which the eNodeBs 12-14 can communicate more directly with each other. For instance, eNodeB 12 and eNodeB 14 may communicate with each other over an inter-base-station interface 20 known in LTE as an "X2" interface 20, which may pass through a core network or over a more direct physical connection between the eNodeB 12 and the eNodeB 14. Moreover, this X2 interface 20 may carry X2AP signaling (e.g., per an X2 access protocol). With such an arrangement, the eNodeB 12 may transmit a message for receipt by eNodeB 14 by transmitting the message via the inter-base-station interface 20 to the eNodeB 14. In this manner, the eNodeB 12 and the eNodeB 14 can communicate with each other without necessarily having the controller 16 facilitate communications between the eNodeBs 12-14 as discussed above.

Given the example network arrangement of FIG. 1, we may assume that UE 22 is positioned within coverage of each of the eNodeBs 12-14. Additionally, we may also assume that UE 22 is attached with the eNodeB 12 and is thus being served by the eNodeB 12 in an idle mode or a connected mode. Further, we may assume that, as the UE 22 is served by the eNodeB 12, the UE 22 regularly monitors a downlink reference signal from the eNodeB 12 and from each other base station of the network that the UE 22 can detect, such as the eNodeB 14. And when the UE 22 detects sufficiently strong coverage from the eNodeB 14, such as coverage sufficiently stronger than that of the eNodeB 12, the UE 14 may transmit a measurement report to the eNodeB 12, which may ultimately trigger a handover process in which the UE 22 hands over from being served by the eNodeB 12 (source base station) to being served by the eNodeB 14 (target base station). In this example, the eNodeB 12 and/or associated supporting infrastructure (e.g., controller 16) may then decide based on the UE's measurement report whether to process a handover of the UE 22 to the eNodeB 14.

In particular, if the eNodeB 12 (and/or supporting infrastructure) determines that the reported signal strength of the eNodeB 14 is sufficient, then the eNodeB 12 may initiate a handover process and this handover process may take various forms. For instance, the handover process may involve the eNodeB 12 and the eNodeB 14 engaging via a communication path in handover signaling with each other to facilitate handover of the UE 22 between the eNodeB 12 and the eNodeB 14. In a default configuration, the eNodeB 12 and the eNodeB 14 may engage in all such handover signaling via the inter-base-station (e.g., X2) interface 20. For example, the eNodeB 12 may transmit a handover request message via the X2 interface 20 to the eNodeB 14 to prepare the eNodeB 14 to receive handover of the UE 22 (e.g., reserving resources to facilitate serving the UE 22). Upon preparing for handover of the UE 22, the eNodeB 14 may then transmit via the X2 interface 20 to the eNodeB 12 a handover request acknowledge message that carries information for use by the UE 22 to engage in communication with the eNodeB 14. And the eNodeB 12 may then transmit to the UE 22 a handover directive to cause the UE 22 to hand over to the eNodeB 14.

In some cases, such handover signaling may facilitate handover of an ongoing voice communication or may facilitate handover of a communication other than an ongoing voice communication. In practice, an ongoing voice communication may generally involve transmission of voice data representative of a user's voice. For example, the UE 22 and a call server (not shown in FIG. 1) may initially engage via the eNodeB 12 in call set up signaling (e.g., Session Initiation Protocol (SIP) signaling) to establish a voice call between UE 22 and another UE. And as the user speaks into the UE 22 during the established voice call, the UE 22 may periodically transmit to the other UE a quantity of data representing the user's voice, and the other UE may thus receive, decode, and play out the voice to another user. Further, the UE 22 may also engage in communications other than an ongoing voice communication. For example, such other communication may be an e-mail communication, a file transfer, a text message, or any other form of communication that includes data other than just voice data communicated as part of a voice call for instance.

When the eNodeB 12 and the eNodeB 14 engage in handover signaling that facilitates handover between the eNodeB 12 and the eNodeB 14 of a certain communication, this handover signaling may involve transmission via the inter-base-station interface 20 of buffered data to be communicated as part of this communication. In particular, when serving the UE 22, the eNodeB 12 may schedule data communications to and from the UE 22 over a wireless air interface. For example, when the eNodeB 12 has bearer traffic to transmit to the UE 22 on the downlink, the eNodeB 12 may allocate channel resources to carry that bearer traffic and may transmit to the UE 22 a message that directs the UE 22 to receive the bearer traffic in the allocated channel resources. Then, when facilitating the handover, associated network infrastructure may have to transition to sending data for the UE 22 to the eNodeB 14 for transmission over the air to the UE 22. And to the extent the eNodeB 12 has already received data for transmission to the UE 22, the eNodeB 12 may transfer at least a portion of that data to the eNodeB 14 so that the eNodeB 14 can transmit that data over the air to the UE 22. As such, when data is buffered in this manner, the eNodeB 12 may transfer that data over the inter-base-station interface 20 to the eNodeB 14 for transmission to the UE 22. Once the UE 22 receives that buffered data, then UE 22 may then continue to receive additional data that the eNodeB 14 receives from the network infrastructure for transmission to the UE 22.

With this arrangement, the buffered data may thus be buffered voice data or may be buffered data other than buffered voice data. In particular, transmission of buffered voice data may allow the UE 22 to continue to engage in the ongoing voice communication as the UE 22 is being handed over between the eNodeB 12 and the eNodeB 14. And similarly, transmission of other buffered data may allow the UE 22 to continue to engage in an ongoing communication (i.e., other than a voice communication) as the UE 22 is being handed over between the eNodeB 12 and the eNodeB 14. Of course, other examples of handover signaling are possible as well.

As noted above, the present disclosure provides for a process that is used to facilitate differential routing of voice handover traffic and non-voice handover traffic in response to congestion on an inter-base-station interface. This process could be carried out by eNodeB 12 itself and/or by one or more other network entities, such as with portions of the analysis carried out by an entity outside of the eNodeB 12 (e.g., controller 16) and the eNodeB 12 then responsively facilitating this differential routing. For simplicity, however, the process will be generally described here in a scenario where the eNodeB 12 carries out all aspects of the process.

In accordance with this process, the eNodeB 12 may encounter a trigger to configure (or reconfigure) transmission of handover signaling between the eNodeB 12 and the eNodeB 14, such as by initiating use for handover signaling of a "differential routing" configuration instead of using the above-mentioned default configuration. This may specifically be a trigger to transition from having all handover signaling being transmitted via the inter-base-station (e.g., X2) interface 20 to having different handover signaling being transmitted via different communication paths as further discussed below. In either case, encountering this trigger could take on various forms.

For example, encountering the trigger may involve the eNodeB 12 determining that a congestion level of the X2 interface 20 is at or above a threshold congestion level (e.g., established by manual engineering input). This threshold congestion of the X2 interface 20 may occur in various situations, such as when the eNodeBs 12-14 engage in handover signaling with each other to facilitate handover of several UEs at once for instance. Accordingly this congestion level may take various forms. In one example, the congestion level may be representative of throughput of data being transmitted as part of the handover signaling via the X2 interface 20. In another example, the congestion level may be representative of latency of data being transmitted as part of the handover signaling via the X2 interface 20. And in yet another example, the congestion level may be representative of a packet-loss rate for data being transmitted as part of the handover signaling via the X2 interface 20. Other examples metrics are possible as well.

In this regard, the eNodeB 12 may detect threshold congestion of the X2 interface 20 by evaluating one or more such metrics. For instance, the eNodeB 12 may evaluate latency of data being transmitted as part of the handover signaling via the X2 interface 20. As an example, after the eNodeB 12 transmits the above-mentioned handover request message via the X2 interface 20 to the eNodeB 14, the eNodeB 12 may determine how long it takes (i.e., determine a duration of time) for the eNodeB 12 to responsively receive via the X2 interface 20 from the eNodeB 14 the above-mentioned handover request acknowledge message. In this example, the eNodeB 12 may then determine whether this determined duration of time is at or above a threshold duration. And if this determined duration of time is at or above the threshold duration, then the eNodeB 12 may responsively determine that the X2 interface 20 is threshold congested. Other example triggers are possible as well.

Once the eNodeB 12 encounters the trigger, the eNodeB 12 may then configure transmission of handover signaling between the eNodeB 12 and the eNodeB 14, such as by initiating use of the above-mentioned differential routing configuration. In accordance with the process, this may involve the eNodeB 12 configuring itself to transmit (i) via the X2 interface 20 rather than via the backhaul interface 18 handover signaling that facilitates handover between the eNodeBs 12-14 of ongoing voice communications and (ii) via the backhaul interface 18 rather than via the X2 interface 20 handover signaling that facilitates handover between the eNodeBs 12-14 of communications other than ongoing voice communications. In this way, the eNodeBs 12-14 may transmit to each other via the X2 interface 20 handover signaling that facilitates handover of ongoing voice communications, and the eNodeBs 12-14 may do so without having the controller 16 facilitate these transmissions between the eNodeBs 12-14. Whereas, the controller 16 may facilitate via the backhaul interface 18 transmissions between the eNodeBs 12-14 of handover signaling that facilitates handover of communication other than ongoing voice communications.

In an example implementation, the eNodeB 12 may configure transmission of handover signaling in various ways. For example, the eNodeB 12 may include or could otherwise refer to data storage containing information related to various configurations for transmission of handover signaling. Also, the data storage may contain mapping data that maps certain triggers being encountered to certain configurations. So when the eNodeB 12 encounters the above-mentioned trigger, the eNodeB 12 may refer to the mapping data to determine that the eNodeB 12 should configure transmission of handover signaling in accordance with the above-mentioned differential routing configuration. Other examples are possible as well.

Moreover, the eNodeB 12 may inform the eNodeB 14 that the eNodeB 14 should also transmit handover signaling in accordance with the differential routing configuration. For example, the eNodeB 12 may transmit (e.g., via any communication path) to the eNodeB 14 an indication indicating that the eNodeB 14 should also transmit handover signaling in accordance with the differential routing configuration, an indication indicating that the eNodeB 12 encountered the above-mentioned trigger, or the like. And once the eNodeB 14 receives this indication, the eNodeB 14 may also configure itself to transmit (i) via the X2 interface 20 rather than via the backhaul interface 18 handover signaling that facilitates handover between the eNodeBs 12-14 of ongoing voice communications and (ii) via the backhaul interface 18 rather than via the X2 interface 20 handover signaling that facilitates handover between the eNodeBs 12-14 of communications other than ongoing voice communications. Other examples are possible as well.

Upon completion of the configuring, the eNodeBs 12-14 may then transmit handover signaling to each other based on the configuring. For instance, when facilitating handover of an ongoing voice communication, the eNodeBs 12-14 may exchange handover signaling via the X2 interface 20. By way of example, the eNodeBs 12-14 may exchange via the X2 interface 20 handover request messages, handover request acknowledge messages, and/or buffered voice data, among other possibilities. Whereas, when facilitating handover of a communication other than an ongoing voice communication, the eNodeBs 12-14 may exchange handover signaling via the backhaul interface 18. By way of example, the eNodeBs 12-14 may exchange via the backhaul interface 18 handover request messages, handover request acknowledge messages, and/or buffered data other than buffered voice data, among other possibilities.

In a more specific example, the eNodeB 12 may serve the UE 22 and while doing so may also determine that the X2 interface 20 is threshold congested. Additionally, while serving the UE 22, the eNodeB 12 may also determine (e.g., based on a measurement report received from the UE 22) that the eNodeB 12 should hand over the UE 22 from being served by the eNodeB 12 to being served by the eNodeB 14. Then, in response to the eNodeB 12 determining that the eNodeB 12 should handover the UE 22 and that the X2 interface 20 is threshold congested, the eNodeB 12 may make a determination of whether the UE 22 is engaging in an ongoing voice communication or whether the UE 22 is engaging in a communication other than an ongoing voice communication.

The eNodeB 12 may make this determination in various ways. For instance, the UE 22 and the eNodeB 12 may exchange data with each other and in doing so the UE 22 and the eNodeB 12 may transmit the data to each other in the form of one or more IP data packets. These IP data packets may each have a respective header segment and a respective payload segment that carries some or all of the data at issue. In some cases, the data carried in the payload segment of such packets may be a digitally encoded representation of particular content being communicated. With this arrangement, the eNodeB 12 may use various techniques (e.g., deep packet inspection (DPI)) to read one or more such packets to determine a type of content being carried by such packet(s). If the determined type of content is voice content, then this may serve as an indication to the eNodeB 12 that the UE 22 is engaging in an ongoing voice communication. And if the determined type of content is content other than voice content (e.g., web content, gaming content, or the like), then this may serve as an indication to the eNodeB 12 that the UE 22 is engaging in a communication other than an ongoing voice communication. Of course, other examples are possible as well.

Once the eNodeB 12 makes a determination of whether the UE 22 is engaging in an ongoing voice communication or whether the UE 22 is engaging in a communication other than an ongoing voice communication, the eNodeB 12 may facilitate transmission of handover signaling based on this determination. In particular, if the eNodeB 12 determines that the UE 22 is indeed engaging in an ongoing voice communication, then the eNodeB 12 may responsively facilitate the handover of the UE 22 by engaging in handover signaling with the eNodeB 14 via the X2 interface 20 rather than via the backhaul interface 18. And if the eNodeB 12 determines that the UE 22 is engages in a communication other than an ongoing voice communication, then the eNodeB 12 may responsively facilitate the handover of the UE 22 by engaging in handover signaling with the eNodeB 14 via the backhaul interface 18 rather than via the X2 interface 20. Other examples are also possible.

In a further aspect, the eNodeB 12 may configure transmission of handover signaling in accordance with this process, but may later determine that the above-mentioned trigger is no longer being encountered. For instance, the eNodeB 12 may determine that the X2 interface 20 is no longer threshold congested. As an example, after the eNodeB 12 again transmits a handover request message via the X2 interface 20 to the eNodeB 14, the eNodeB 12 may again determine how long it takes (i.e., determine the duration of time) for the eNodeB 12 to responsively receive via the X2 interface 20 from the eNodeB 14 a handover request acknowledge message. In this example, the eNodeB 12 may then determine that this determined duration of time is below the threshold duration, thereby determining that the X2 interface 20 is no longer threshold congested.

Once the eNodeB 12 determines that the trigger is no longer being encountered, the eNodeB 12 may responsively reconfigure transmission of handover signaling by reverting back to the default configuration. In particular, the eNodeB 12 may reconfigure itself to again transmit via the X2 interface 20 rather than via the backhaul interface 18 both (i) handover signaling that facilitates handover between the eNodeBs 12-14 of ongoing voice communications and (ii) handover signaling that facilitates handover between the eNodeBs 12-14 of communications other than ongoing voice communications. Moreover, the eNodeB 12 may inform the eNodeB 14 of this reconfiguring, so as to cause the eNodeB 14 to also transmit handover signaling via the X2 interface 20 rather than via the backhaul interface 18 regardless of the types of communications being facilitated. Other aspects are also possible.

Figure 2:
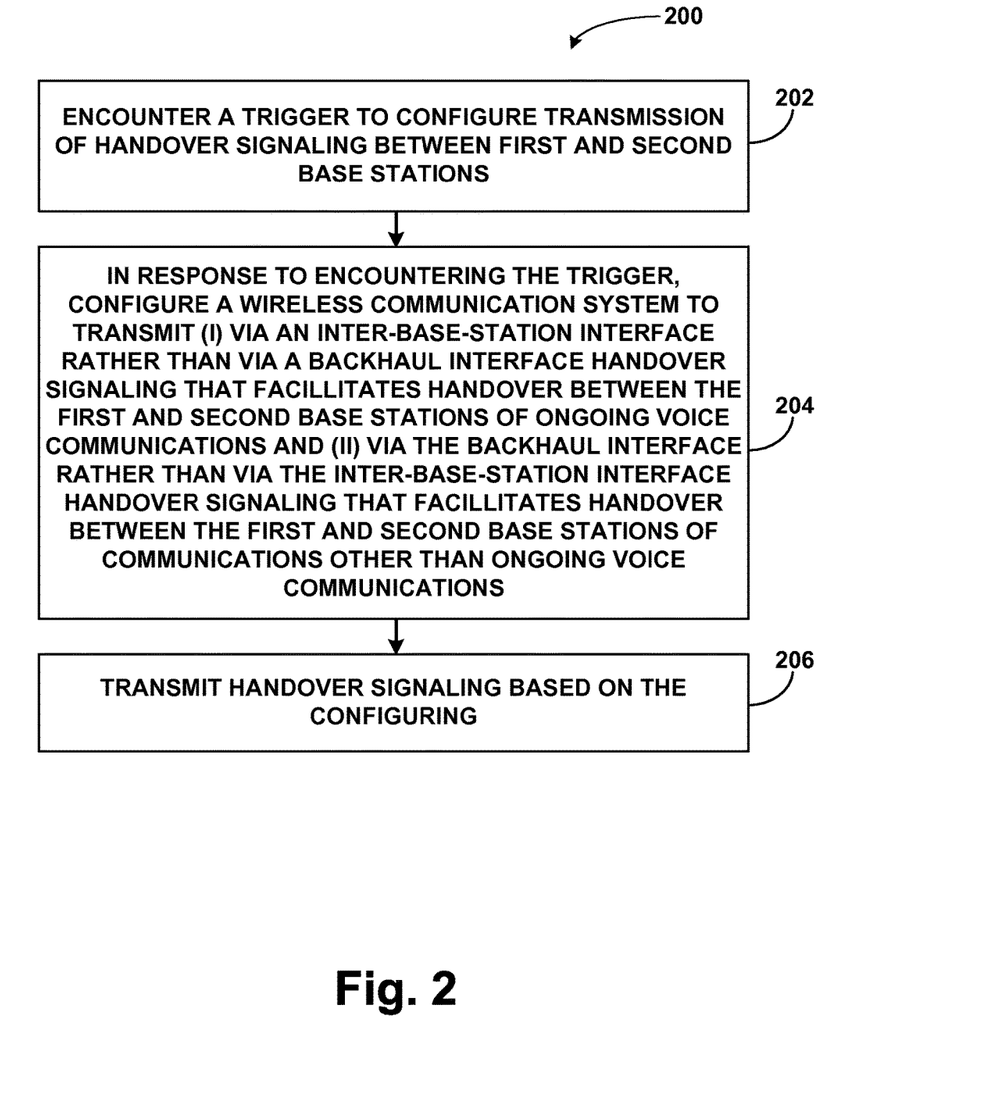
FIG. 2 is a flowchart illustrating a method to facilitate differential routing of voice handover traffic and non-voice handover traffic in response to congestion on an inter-base-station interface, in accordance with an example embodiment.

FIG. 2 is next a flow chart illustrating a method 200, according to an example embodiment. Illustrative methods, such as method 200, may be carried out in whole or in part by component(s) and/or arrangement(s) in a wireless communication system, such as by the one or more of the components of the representative network shown in FIG. 1 and/or with one or more of the components of the base station 500 shown in FIG. 5 and further discussed below. However, it should be understood that example methods, such as method 200, may be carried out by other entities or combinations of entities as well as in other arrangements, without departing from the scope of the disclosure.

In particular, method 200 may be operable in a wireless communication system including a backhaul-network entity, a backhaul interface that passes through the backhaul-network entity, an inter-base-station interface that does not pass through the backhaul-network entity, first and second base stations that are communicatively linked via (i) the backhaul interface and (ii) the inter-base-station interface, and a controller (e.g., the backhaul-network entity may be the controller) configured to cause the wireless communication system to perform operations. Accordingly, as shown by block 202 in FIG. 2, method 200 involves the wireless communication system encountering a trigger to configure transmission of handover signaling between the first and second base stations. At block 204, method 200 then involves, in response to encountering the trigger, configuring the wireless communication system to transmit (i) via the inter-base-station interface rather than via the backhaul interface handover signaling that facilitates handover between the first and second base stations of ongoing voice communications and (ii) via the backhaul interface rather than via the inter-base-station interface handover signaling that facilitates handover between the first and second base stations of communications other than ongoing voice communications. And at block 206, method 200 then involves the wireless communication system transmitting handover signaling based on the configuring.

Figure 3:
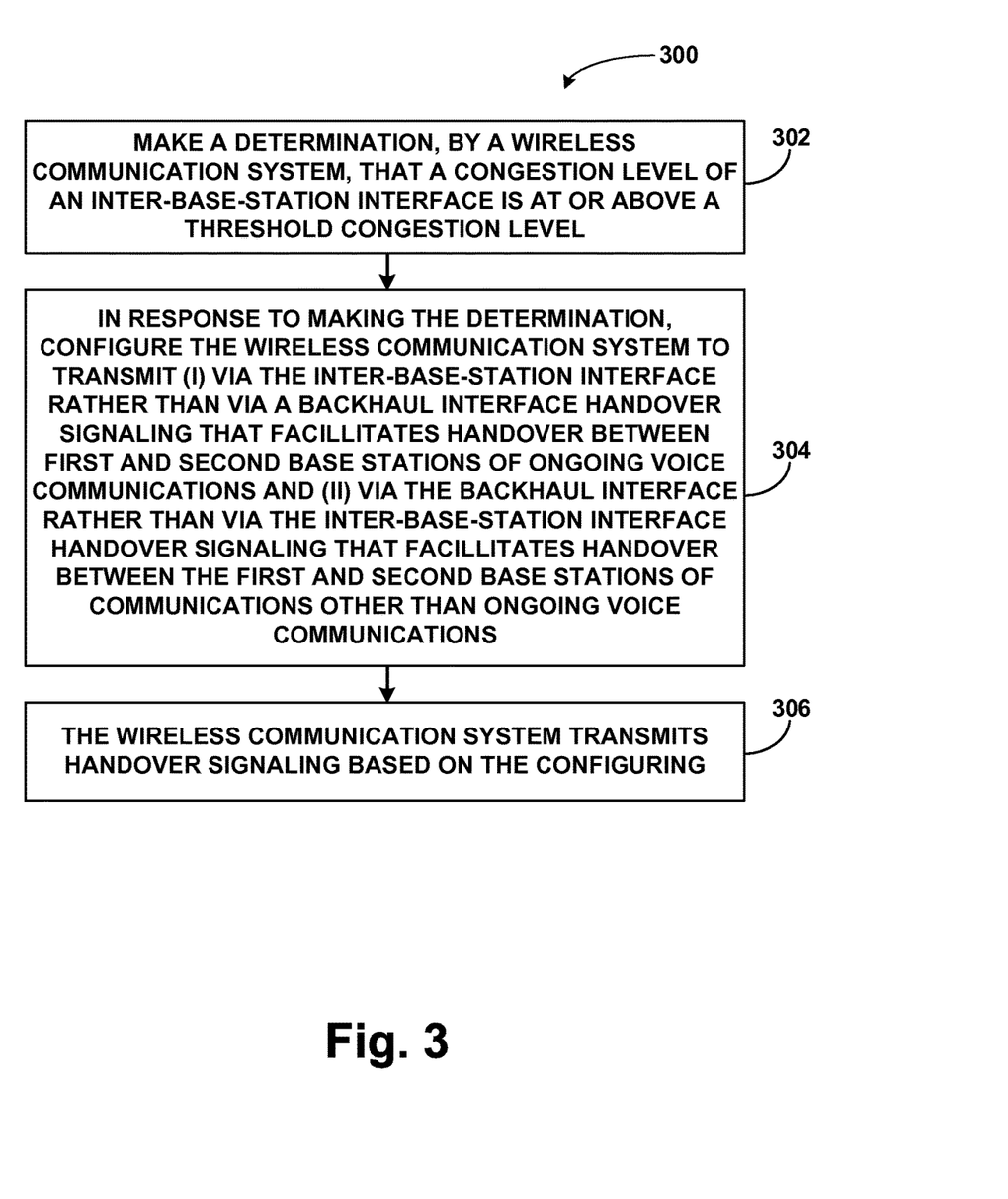
FIG. 3 is a flowchart illustrating another method to facilitate differential routing of voice handover traffic and non-voice handover traffic in response to congestion on an inter-base-station interface, in accordance with an example embodiment.

FIG. 3 is next a flow chart illustrating a method 300, according to an example embodiment. In particular, method 300 is operable in a wireless communication system including a controller and first and second base stations, wherein the first and second base stations are communicatively linked via (i) a backhaul interface on which the controller resides and (ii) an inter-base-station interface on which the controller does not reside. Accordingly, as shown by block 302 in FIG. 3, method 300 involves the wireless communication system making a determination that a congestion level of the inter-base-station interface is at or above a threshold congestion level. At block 304, method 300 then involves, in response to making the determination, configuring the wireless communication system to transmit (i) via the inter-base-station interface rather than via the backhaul interface handover signaling that facilitates handover between the first and second base stations of ongoing voice communications and (ii) via the backhaul interface rather than via the inter-base-station interface handover signaling that facilitates handover between the first and second base stations of communications other than ongoing voice communications. And at block 306, method 300 then involves the wireless communication system transmitting handover signaling based on the configuring.

Figure 4:
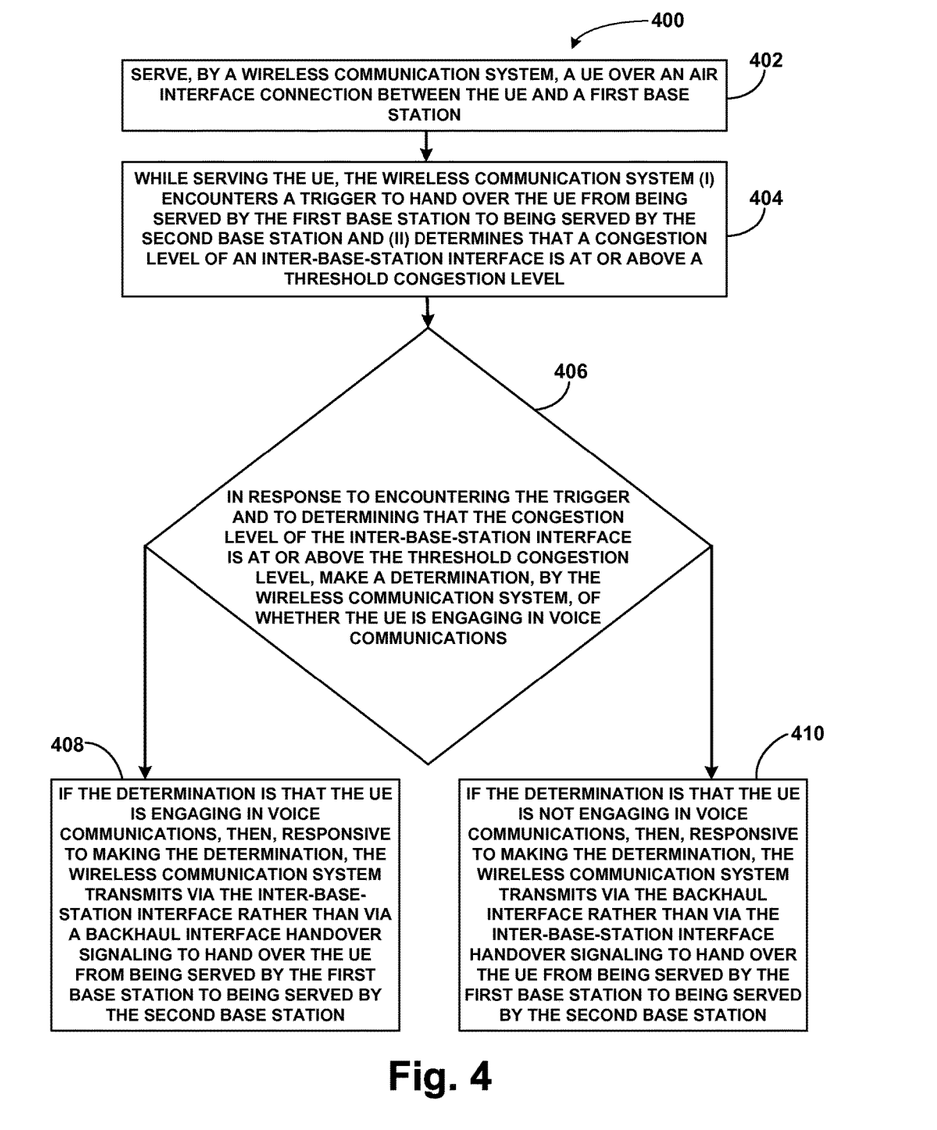
FIG. 4 is a flowchart illustrating yet another method to facilitate differential routing of voice handover traffic and non-voice handover traffic in response to congestion on an inter-base-station interface, in accordance with an example embodiment.

FIG. 4 is next a flow chart illustrating a method 400, according to an example embodiment. In particular, method 400 is operable in a wireless communication system including a controller and first and second base stations, wherein the first and second base stations are communicatively linked via (i) a backhaul interface that passes through the controller and (ii) an inter-base-station interface that does not pass through the controller. Accordingly, as shown by block 402 in FIG. 4, method 400 involves the wireless communication system serving a UE over an air interface connection between the UE and the first base station. At block 404, method 400 then involves, while serving the UE, the wireless communication system (i) encountering a trigger to hand over the UE from being served by the first base station to being served by the second base station and (ii) determining that a congestion level of the inter-base-station interface is at or above a threshold congestion level.

At block 406, method 400 then involves, in response to encountering the trigger and to determining that the congestion level of the inter-base-station interface is at or above the threshold congestion level, the wireless communication system making a determination of whether the UE is engaging in voice communications. At block 408, method 400 then involves, if the determination is that the UE is engaging in voice communications, then, responsive to making the determination, the wireless communication system transmitting via the inter-base-station interface rather than via the backhaul interface handover signaling to hand over the UE from being served by the first base station to being served by the second base station. And at block 410, method 400 then involves, if the determination is that the UE is not engaging in voice communications, then, responsive to making the determination, the wireless communication system transmitting via the backhaul interface rather than via the inter-base-station interface handover signaling to hand over the UE from being served by the first base station to being served by the second base station.

Figure 5:
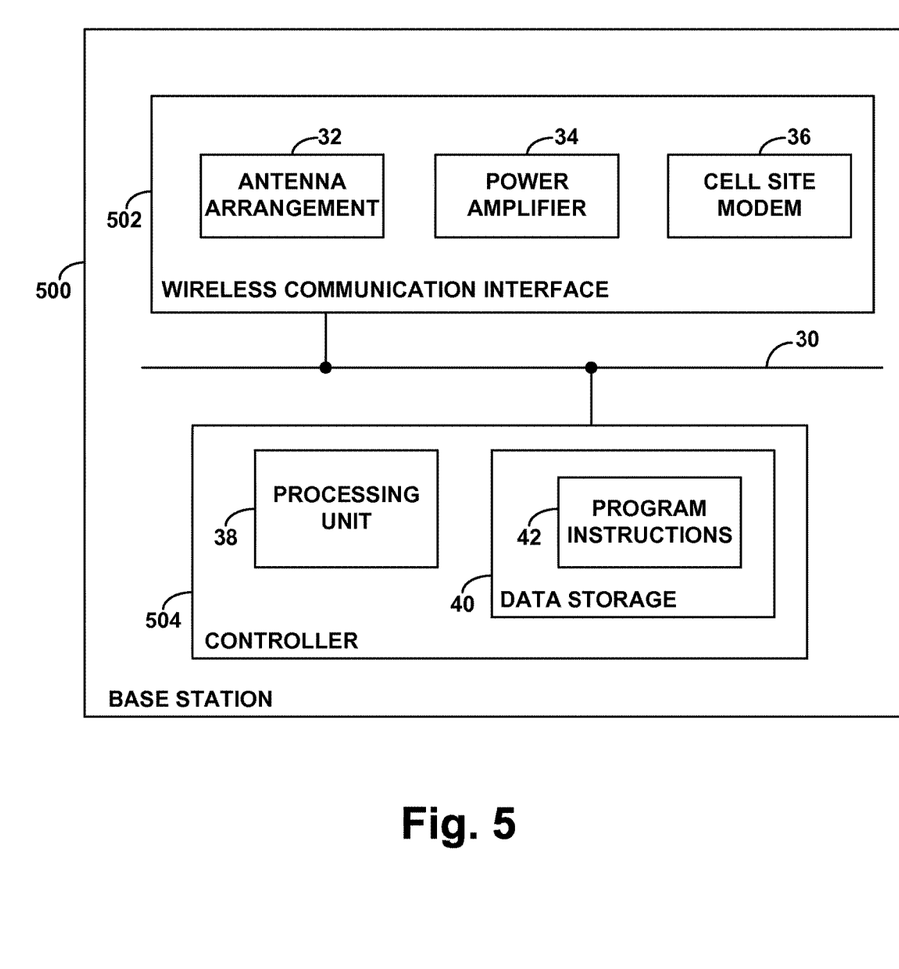
FIG. 5 is a simplified block diagram of a base station in which the present method can be implemented.

Finally, FIG. 5 is next a simplified block diagram of a representative base station 500 such as eNodeB 12 or eNodeB 14, illustrating some of the components that could be involved in implementing base station operations described herein. As shown in FIG. 5, the representative base station 500 may include a wireless communication interface 502 and a controller 504. Additionally, these components of the base station 500 may be communicatively linked together by a system bus, network, or other connection mechanism 30. Alternatively, they may be integrated together in various ways.

As shown, wireless communication interface 502 may include an antenna arrangement 32, which may be tower mounted, and associated components such as a power amplifier 34 and a cell site modem 36 for engaging in air interface communication with UEs via the antenna arrangement 32, so as to transmit data and control information to the UEs and receive data and control information from the UEs. Additionally, controller 504 may include processing unit 38 and data storage 40 and is arranged to manage or carry out various functions such as those discussed herein.

Processing unit 38 may then comprise one or more general purpose processors (e.g., microprocessors) and/or special-purpose processors (e.g., digital signal processors and/or application specific integrated circuits) and may be integrated in whole or in part with the wireless communication interface 502. And data storage 40 may include one or more volatile and/or non-volatile storage components, such as magnetic, optical, flash, or other types of non-transitory computer readable media, and may be integrated in whole or in part with processing unit 38.

As shown, data storage 40 may hold (e.g., have encoded thereon) program instructions 42, which may be executable by processing unit 38 to carry out various controller functions. As such, the processing unit 38 programmed with instructions 42 may define part or all of a controller for controlling operation of the base station 500. Alternatively or additionally, however, such control functionality could be provided external to the base station 500, in another entity (e.g., separate from the base station 500) such as by a base station control entity (e.g., MME 18), which may be communicatively linked with the base station and may serve to control certain aspects of base station operation generally.

Exemplary embodiments have been described above. Those skilled in the art will understand, however, that changes and modifications may be made to these embodiments without departing from the true scope and spirit of the invention.

We claim:

1. A method operable in a wireless communication system comprising a controller and first and second base stations, wherein the first and second base stations are communicatively linked via (i) a backhaul interface on which the controller resides and (ii) an inter-base-station interface on which the controller does not reside, the method comprising:
    making a determination, by the wireless communication system, that a congestion level of the inter-base-station interface is at or above a threshold congestion level;
    in response to making the determination, configuring the wireless communication system to transmit (i) via the inter-base-station interface rather than via the backhaul interface handover signaling that facilitates handover between the first and second base stations of ongoing voice communications and (ii) via the backhaul interface rather than via the inter-base-station interface handover signaling that facilitates handover between the first and second base stations of communications other than ongoing voice communications; and
    the wireless communication system transmitting handover signaling based on the configuring.

2. The method of claim 1, wherein, before the configuring, the wireless communication transmits via the inter-base-station interface rather than via the backhaul interface both (i) handover signaling that facilitates handover between the first and second base stations of ongoing voice communications and (ii) handover signaling that facilitates handover between the first and second base stations of communications other than ongoing voice communications.

3. The method of claim 1, wherein the congestion level is representative of one or more of: (i) throughput, (ii) latency, and (iii) packet-loss rate.

4. The method of claim 1, wherein configuring the wireless communication system to transmit via the inter-base-station interface rather than via the backhaul interface handover signaling that facilitates handover between the first and second base stations of ongoing voice communications comprises:
    configuring the wireless communication system to transmit via the inter-base-station interface rather than via the backhaul interface buffered voice data that is to be communicated as part of ongoing voice communications being handed over between the first and second base stations.

5. The method of claim 1, further comprising:
making a further determination, by the wireless communication system, that the congestion level of the inter-base-station interface is no longer at or above the threshold congestion level;
in response to making the further determination, reconfiguring the wireless communication system to transmit via the inter-base-station interface rather than via the backhaul interface both (i) handover signaling that facilitates handover between the first and second base stations of ongoing voice communications and (ii) handover signaling that facilitates handover between the first and second base stations of communications other than ongoing voice communications; and
after reconfiguring the wireless communication system, the wireless communication system transmitting handover signaling based on the reconfiguring.

6. A method operable in a wireless communication system comprising a controller and first and second base stations, wherein the first and second base stations are communicatively linked via (i) a backhaul interface that passes through the controller and (ii) an inter-base-station interface that does not pass through the controller, the method comprising:
serving, by the wireless communication system, a user equipment device (UE) over an air interface connection between the UE and the first base station;
while serving the UE, the wireless communication system (i) encountering a trigger to hand over the UE from being served by the first base station to being served by the second base station and (ii) determining that a congestion level of the inter-base-station interface is at or above a threshold congestion level;
in response to encountering the trigger and to determining that the congestion level of the inter-base-station interface is at or above the threshold congestion level, making a determination, by the wireless communication system, of whether the UE is engaging in voice communications;
if the determination is that the UE is engaging in voice communications, then, responsive to making the determination, the wireless communication system transmitting via the inter-base-station interface rather than via the backhaul interface handover signaling to hand over the UE from being served by the first base station to being served by the second base station; and
if the determination is that the UE is not engaging in voice communications, then, responsive to making the determination, the wireless communication system transmitting via the backhaul interface rather than via the inter-base-station interface handover signaling to hand over the UE from being served by the first base station to being served by the second base station.

7. The method of claim 6,
wherein the wireless communication system transmitting via the inter-base-station interface rather than via the backhaul interface handover signaling to hand over the UE from being served by the first base station to being served by the second base station is further responsive to determining that the congestion level of the inter-base-station interface is at or above the threshold congestion level, and
wherein the wireless communication system transmitting via the backhaul interface rather than via the inter-base-station interface handover signaling to hand over the UE from being served by the first base station to being served by the second base station is further responsive to determining that the congestion level of the inter-base-station interface is at or above the threshold congestion level.

8. The method of claim 7, wherein, before determining that the congestion level of the inter-base-station interface is at or above the threshold congestion level, the wireless communication system transmits handover signaling via the inter-base-station interface rather than via the backhaul interface regardless of whether the UE is engaging in voice communications.

9. The method of claim 7, further comprising:
after determining that the congestion level of the inter-base-station interface is at or above the threshold congestion level, making a further determination that the congestion level of the inter-base-station interface is no longer at or above the threshold congestion level; and
in response to making the further determination, the wireless communication system transmitting handover signaling via the inter-base-station interface rather than via the backhaul interface regardless of whether the UE is engaging in voice communications.

10. The method of claim 6, wherein the congestion level is representative of one or more of: (i) throughput, (ii) latency, and (iii) packet-loss rate.

11. The method of claim 6, wherein the wireless communication system transmitting handover signaling via the inter-base-station interface rather than via the backhaul interface if the determination is that the UE is engaging in voice communications comprises:
if the determination is that the UE is engaging in voice communications, then, responsive to making the determination, the wireless communication system transmitting via the inter-base-station interface rather than via the backhaul interface buffered voice data that is to be communicated as part of the voice communications.

12. A wireless communication system comprising:
a backhaul-network entity;
a backhaul interface that passes through the backhaul-network entity;
an inter-base-station interface that does not pass through the backhaul-network entity;
first and second base stations that are communicatively linked via (i) the backhaul interface and (ii) the inter-base-station interface; and
a controller configured to cause the wireless communication system to perform operations comprising:
encountering a trigger to configure transmission of handover signaling between the first and second base stations;
in response to encountering the trigger, configuring the wireless communication system to transmit (i) via the inter-base-station interface rather than via the backhaul interface handover signaling that facilitates handover between the first and second base stations of ongoing voice communications and (ii) via the backhaul interface rather than via the inter-base-station interface handover signaling that facilitates handover between the first and second base stations of communications other than ongoing voice communications; and
transmitting handover signaling based on the configuring.

13. The wireless communication system of claim 12, wherein the controller is further configured to cause the wireless communication system to perform operations comprising:
before encountering the trigger to configure transmission of handover signaling between the first and second base stations, arranging the wireless communication system to transmit via the inter-base-station interface rather than via the backhaul interface both (i) handover signaling that facilitates handover between the first and second base stations of ongoing voice communications and (ii) handover signaling that facilitates handover between the first and second base stations of communications other than ongoing voice communications.

14. The wireless communication system of claim 12, wherein the controller is further configured to cause the wireless communication system to perform operations comprising:
determining that the trigger is no longer being encountered; and
in response to determining that the trigger is no longer being encountered, reconfiguring the wireless communication system to transmit via the inter-base-station interface rather than via the backhaul interface both (i) handover signaling that facilitates handover between the first and second base stations of ongoing voice communications and (ii) handover signaling that facilitates handover between the first and second base stations of communications other than ongoing voice communications.

15. The wireless communication system of claim 12, wherein configuring the wireless communication system to transmit via the inter-base-station interface rather than via the backhaul interface handover signaling that facilitates handover between the first and second base stations of ongoing voice communications comprises:
configuring the wireless communication system to transmit via the inter-base-station interface rather than via the backhaul interface buffered voice data that is to be communicated as part of ongoing voice communications being handed over between the first and second base stations.

16. The wireless communication system of claim 12, wherein encountering the trigger comprises determining that a congestion level of the inter-base-station interface is at or above a threshold congestion level.

17. The wireless communication system of claim 12, wherein the backhaul-network entity is the controller.

18. The wireless communication system of claim 12, wherein the controller is part of the first base station or part of the second base station.

19. The wireless communication system of claim 12, wherein the inter-base-station interface comprises an X2 interface.

20. The wireless communication system of claim 12, wherein the backhaul-network entity comprises a mobility management interface.

* * * * *